(12) United States Patent
Gao et al.

(10) Patent No.: US 10,305,356 B2
(45) Date of Patent: May 28, 2019

(54) SYNCHRONOUS MACHINE WITH COMMON MOTOR/GENERATOR EXCITER STAGE

(71) Applicant: The Boeing Company, Chicago, IL (US)

(72) Inventors: Lijun Gao, Renton, WA (US); Matthew J. Krolak, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 472 days.

(21) Appl. No.: 14/498,186

(22) Filed: Sep. 26, 2014

(65) Prior Publication Data
US 2016/0094114 A1    Mar. 31, 2016

(51) Int. Cl.
| | |
|---|---|
| *H02P 9/02* | (2006.01) |
| *H02K 11/042* | (2016.01) |
| *H02K 19/38* | (2006.01) |
| *H02K 3/28* | (2006.01) |
| *H02K 15/06* | (2006.01) |

(52) U.S. Cl.
CPC ............ *H02K 19/38* (2013.01); *H02K 3/28* (2013.01); *H02K 11/042* (2013.01); *H02K 15/062* (2013.01); *H02P 9/02* (2013.01)

(58) Field of Classification Search
CPC .... H02P 9/02; H02P 9/00; H02P 31/00; H02P 2103/20; H02K 3/28; H02K 11/042; H02K 15/062
USPC .............. 322/17, 29, 32, 44, 45, 59, 89, 47; 310/113
See application file for complete search history.

(56) References Cited

U.S. PATENT DOCUMENTS

| | | | | |
|---|---|---|---|---|
| 3,614,593 A | * | 10/1971 | Lace | ..................... H02K 19/26 310/68 R |
| 4,093,869 A | | 6/1978 | Hoffmann et al. | |

(Continued)

FOREIGN PATENT DOCUMENTS

| | | |
|---|---|---|
| AU | 708569 B3 | 8/1999 |
| CN | 101924440 A | 12/2010 |

(Continued)

OTHER PUBLICATIONS

French Preliminary Search Report for Applicaton No. FA 839934 dated Mar. 6, 2018.

(Continued)

*Primary Examiner* — Burton Mullins
(74) *Attorney, Agent, or Firm* — Patterson + Sheridan, LLP (57) ABSTRACT

A synchronous machine (100) has a frame (110), a shaft (115), a main section (120), and an exciter section (125). The main section (120) has a stator winding (130) which is mounted on the frame, and a rotor winding (135) which is mounted on the shaft. The exciter section has a transformer (140) and a rectifier (145). The transformer has a primary winding (140A) mounted on the frame and a secondary winding (140B) mounted on the shaft. The rectifier is mounted on the shaft and rectifies an output of the secondary winding to provide a rectified output to the rotor. A control unit (170) provides a high-frequency control signal to the primary winding. This signal is magnetically coupled to the secondary winding, rectified, and then applied to the rotor to control the operation of the synchronous machine.

16 Claims, 3 Drawing Sheets

(56) References Cited

U.S. PATENT DOCUMENTS

| | | | | |
|---|---|---|---|---|
| 4,210,857 | A | * | 7/1980 | Korbell ................ H02J 7/16 322/28 |
| 4,625,160 | A | * | 11/1986 | Hucker ................ H02K 3/16 310/115 |
| 4,743,777 | A | * | 5/1988 | Shilling ................ F02N 11/04 290/31 |
| 4,772,802 | A | * | 9/1988 | Glennon ................ F02N 11/04 290/31 |
| 4,937,723 | A | * | 6/1990 | Rozman ................ H02M 5/451 363/132 |
| 4,982,123 | A | | 1/1991 | Raad |
| 5,068,590 | A | * | 11/1991 | Glennon ................ F02N 11/04 290/38 R |
| 5,334,898 | A | | 8/1994 | Skybyk |
| 5,493,200 | A | | 2/1996 | Rozman et al. |
| 5,581,168 | A | | 12/1996 | Rozman et al. |
| 5,585,709 | A | * | 12/1996 | Jansen ................ H02K 17/165 318/720 |
| 5,594,322 | A | | 1/1997 | Rozman et al. |
| 5,770,909 | A | | 6/1998 | Rosen et al. |
| 6,483,218 | B1 | * | 11/2002 | Petrinko ................ H01F 38/18 310/112 |
| 6,753,634 | B2 | | 6/2004 | Rehder |
| 6,809,496 | B2 | * | 10/2004 | Anghel ................ H02P 6/18 318/430 |
| 6,844,707 | B1 | * | 1/2005 | Raad ................ F02N 11/04 290/46 |
| 6,847,194 | B2 | | 1/2005 | Sarlioglu et al. |
| 6,906,479 | B2 | | 6/2005 | Xu et al. |
| 6,933,704 | B2 | | 8/2005 | Nelson et al. |
| 6,960,840 | B2 | | 11/2005 | Willis et al. |
| 6,998,726 | B2 | | 2/2006 | Sarlioglu et al. |
| 7,078,826 | B2 | * | 7/2006 | Xu ................ H02K 19/16 290/31 |
| 7,122,994 | B2 | * | 10/2006 | Anghel ................ F02N 11/04 322/60 |
| 7,154,249 | B2 | * | 12/2006 | Velhner ................ F02N 11/04 322/59 |
| 7,301,311 | B2 | | 11/2007 | Xu et al. |
| 7,388,300 | B2 | | 6/2008 | Anghel et al. |
| 7,400,056 | B2 | * | 7/2008 | McGinley ................ F02C 7/268 290/31 |
| 7,514,806 | B2 | | 4/2009 | Xu et al. |
| 7,728,447 | B2 | * | 6/2010 | Becquerelle ........... H02K 7/116 290/3 |
| 7,821,145 | B2 | | 10/2010 | Huang et al. |
| 7,915,869 | B2 | * | 3/2011 | Xu ................ H02K 19/38 322/59 |
| 8,542,085 | B2 | | 9/2013 | Stancu et al. |
| 8,928,293 | B1 | * | 1/2015 | Rozman ................ H02P 9/14 290/31 |
| 9,041,232 | B2 | | 5/2015 | Shah et al. |
| 9,209,741 | B2 | | 12/2015 | Gao et al. |
| 2004/0057257 | A1 | | 3/2004 | Sarlioglu et al. |
| 2004/0070373 | A1 | | 4/2004 | Nelson et al. |
| 2004/0108726 | A1 | | 6/2004 | Sarlioglu et al. |
| 2005/0046398 | A1 | | 3/2005 | Anghel et al. |
| 2006/0038405 | A1 | | 2/2006 | Xu et al. |
| 2008/0067984 | A1 | | 3/2008 | Anghel et al. |
| 2008/0303280 | A1 | | 12/2008 | Xu et al. |
| 2014/0145541 | A1 | | 5/2014 | Jalebi et al. |
| 2015/0097372 | A1 | | 4/2015 | Patel et al. |
| 2015/0102659 | A1 | | 4/2015 | Liffring et al. |
| 2015/0103447 | A1 | | 4/2015 | Brouwer et al. |
| 2015/0103457 | A1 | | 4/2015 | Shander et al. |
| 2015/0198655 | A1 | | 7/2015 | Viswanathan et al. |

FOREIGN PATENT DOCUMENTS

| | | |
|---|---|---|
| DE | 2524285 A1 | 1/1976 |
| DE | 102010063734 A1 | 6/2012 |
| DE | 102012006559 A1 | 10/2013 |
| EP | 0645874 A1 | 3/1995 |
| EP | 2551999 A1 | 1/2013 |

OTHER PUBLICATIONS

Synchronous machine. In: Wikipedia, the free encyclopaedia. Working status: Sep. 10, 2014, 21:02 UTC. URL: http://de.wikipedia.org/w/index.php [retrieved on: May 28, 2018].

Chinese Office Action for Application No. 201506295523 dated Oct. 8, 2018.

* cited by examiner

SYNCHRONOUS MACHINE WITH COMMON MOTOR/GENERATOR EXCITER STAGE

BACKGROUND

A synchronous machine is an electric machine which can be operated as either a synchronous motor (synchronous motor mode) or a synchronous generator (synchronous generator mode). Conventionally, a synchronous machine has two separate and independent exciter field windings. Also, conventionally, two separate and independent control units have been used, one control unit for the exciter field winding for the synchronous motor mode and another control unit for the exciter field winding for the synchronous generator mode. The use of two exciter field windings and two control units make the synchronous machine and the system in which it is being used more complicated, heavier, and less reliable. The dual excitation components of a conventional synchronous machine may represent 20 to 30% of the total volume and weight of the synchronous machine. Some conventional systems use only a single, reconfigurable field winding, but still use two separate and independent control units, which then use switches or contactors to connect the appropriate control unit to the field winding. Dual field windings, dual control units, and/or switches and/or contactors add cost, weight, volume, and complexity to the system, and adversely affect the overall reliability of the system. U.S. Pat. No. 5,770,909 to Rosen et al., hereby incorporated in its entirety herein by reference, discloses a synchronous motor-generator system which uses a rotary transformer.

Conventional synchronous machines also use a low frequency excitation current and large field windings are used to avoid energy losses. These large field windings substantially increase the amount and weight of the expensive copper used in the windings. Further, with the conventional low frequency excitation current, the back electromotive force generated in the field windings is significantly affected by the rotor speed, and this can cause stability problems during the startup process.

SUMMARY OF THE DISCLOSURE

A synchronous machine is disclosed which is operable as either a synchronous motor or a synchronous generator. The synchronous machine has a frame, a shaft, a main section, and an exciter section. The main section has a stator (a stationary winding, which may be an armature winding) which is mounted on the frame, and a rotor (a rotating winding, which may be a field winding) which is mounted on the shaft, the stator and the rotor being magnetically coupled to each other. The exciter section has a transformer and a rectifier. The transformer has a primary winding secured to the frame and a secondary winding secured to the shaft. The primary and secondary windings are spaced apart from, and magnetically coupled to, each other. The rectifier is electrically connected to the secondary winding, is mechanically connected to the rotor, and rectifies an output of the secondary winding to provide a rectified output to the rotor. The primary winding and the secondary winding of the transformer are each in the shape of a disk.

A control unit provides a control signal to the primary winding to control the operation of the synchronous machine.

In one embodiment, the primary winding has an interior radius and the disk defines a plane which is perpendicular to the shaft, and the secondary winding has an exterior radius, which is smaller than the interior radius, so the secondary winding is positioned within the primary winding.

In another embodiment, the primary winding is mounted to the frame at an end of the shaft, the disk of the primary winding defining a first plane which is perpendicular to the shaft, and the secondary winding is secured to the shaft near an end of the shaft, the disk of the secondary winding defining a second plane which is perpendicular to the shaft, the second plane being parallel to and spaced apart from the first plane, the shaft does not penetrate the first plane, and the shaft has a channel in which electrical conductors are placed to connect the rectifier with at least one of the secondary winding or the rotor.

A method of manufacturing a synchronous machine operable as either a synchronous motor or a synchronous generator is also disclosed. The method includes providing a frame, mounting a stator on the frame, providing a shaft which extends from at least one end of the frame, mounting a rotor on the shaft, mounting a primary winding of a transformer on the frame, mounting a secondary winding of the transformer on the shaft, spaced apart from, but magnetically connected to, the primary winding, securing a rectifier to the shaft, and electrically connecting an input of the rectifier to the secondary winding and an output of the rectifier to the rotor. Either the secondary winding is mounted within the primary winding, such that they are in the same plane, or the secondary winding is mounted facing the primary winding, so that they are in different planes. A channel is provided in the shaft so that electrical conductors may be run from the rectifier to the secondary winding and/or the rotor.

DETAILED DESCRIPTION

Figure 1:
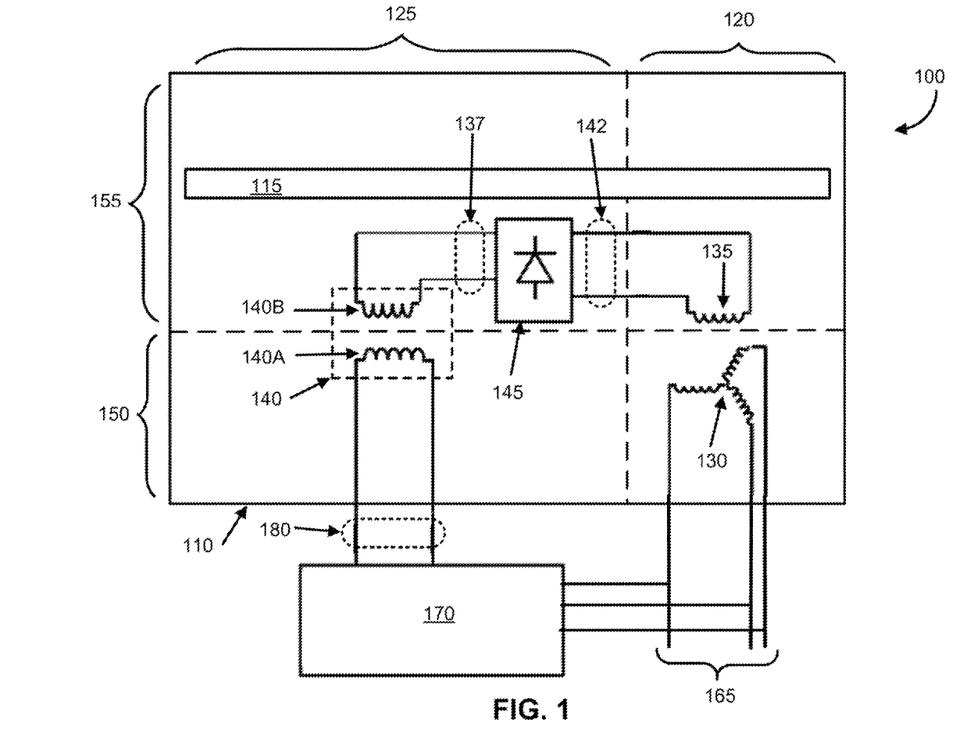
FIG. 1 is a diagram of an exemplary synchronous machine.

FIG. 1 is a diagram of an exemplary synchronous machine 100. The synchronous machine 100 has a frame 110, a shaft 115, a main section 120, and an exciter section 125. The main section 120 has a stator 130 (a stationary winding, which may be an armature winding) which is mounted on the frame, and a rotor 135 (a rotating winding, which may be a field winding) which is mounted on the shaft 115. Part of or all of the frame 110 may be part of, or may be distinct from, a casing which encloses the synchronous machine 100.

The exciter section 125 has a transformer 140 and a rectifier 145. The transformer 140 has a primary winding 140A mounted on the frame 110 and a secondary winding 140B mounted on the shaft 115. The secondary winding 140B is spaced apart from, and is magnetically coupled to, the primary winding 140A. The rectifier 145 is electrically connected by a plurality of electrical conductors 137 to the secondary winding 140B, is electrically connected by a plurality of electrical conductors 142 to the rotor 135, and rectifies an output of the secondary winding 140B to provide a rectified output to the rotor 135. For convenience and brevity of expression, "electrical conductors", and a "plurality of electrical conductors", are sometimes referred to herein simply as "conductors". The rectifier 145 is secured to the shaft 115, either by being mounted on the shaft 115 or by another desired and appropriate technique, such as including the rectifier 115 with the secondary winding of the transformer 140. If desired, the output of the secondary winding 140B and/or the rectifier 145 may be filtered or smoothed before being applied to the rotor 135.

One may also consider the synchronous machine 100 as having a stationary section 150 and a rotating section 155, the stationary section 150 comprising the frame 110, the primary winding 140A, and the stator 130, and the rotating section 155 comprising the shaft 115, the rotor 135, the secondary winding 140B, and the rectifier 145.

The electrical lines 165 connected to the stator 130 serve as input lines to provide an electrical input voltage and power to the synchronous machine 100 when operation is in the synchronous motor mode, and serve as output lines to provide an electrical output voltage and power from the synchronous machine 100 when operation is in the synchronous generator mode.

A control unit 170 monitors one or more parameters of the electrical lines 165 and provides an output control signal over conductors 180 to the primary winding 140A. The control unit 170 may monitor parameters such, as but not limited to, the voltage, current, frequency, and/or phase on the electrical lines 165. The parameters which are monitored may depend in part on whether the machine 100 is being operated as a motor or as a generator. These input parameters may be filtered, if desired, to reduce noise before they are provided to the control unit 170.

The control signal is an alternating waveform voltage (AC voltage) such as, but not limited to, a pulse width modulated (PWM) AC signal. The control signal preferably has a rectangular waveform, such as provided by a pulse width modulation switching system, but may be a sinusoidal waveform, or another desired waveform. The control unit 170 controls at least one of a pulse width, a voltage (which may be a pulse voltage), or a frequency (which may be a pulse frequency) of the control signal. The control signal may be a plurality of pulses or a plurality of cycles of an AC signal, a single pulse or a cycle of an AC signal, a part of a cycle of an AC signal, or a combination thereof. For example, depending upon the monitored input parameters, the control signal may be two pulses or two cycles of an AC signal, may be 6½ pulses or 6½ cycles of an AC signal, or may be less than a full cycle of an AC signal. Pulses may be in sets, with variable lengths, with different numbers in different sets, and/or variable spacing between sets. The control signal may be filtered, if desired, before being provided to the primary winding 140A.

The control signal is a "high frequency" control signal; that it, it has a frequency which is higher than the input frequency (motor mode), that is, the frequency of the input signal on electrical lines 165, and higher than the output frequency (generator mode), that is, the frequency of the output signal on electrical lines 165. More preferably, the frequency of the control signal is at least several times higher than the frequency of the voltage on electrical lines 165. Even more preferably, the frequency of the control signal is at least 10 times the frequency of the voltage on electrical lines 165 in order to minimize the effects on excitation caused by the rotation speed of the rotor 135. Higher frequencies may also be used. Lower frequencies may also be used, but the size, weight, and cost of the windings 140A, 140B may increase as the frequency is lowered, and coupling between the primary and secondary windings may become affected by the rotational speed of the shaft. In one implementation, the frequency of the control signal provided to the transformer 140 is 10 kHz if the frequency of the voltage on electrical lines 165 is 400 Hz. In addition, the use of such a higher frequency for the control signal allows the transformer 140 to use smaller windings, and less iron, that the exciter armature windings of conventional systems.

The control unit 170 may also monitor other parameters or aspects of the operation of the synchronous machine 100 such as, by way of example and not of limitation, the rotation speed, the shaft angular position, the changes therein, etc. For example, a shaft position encoder (not shown) may be connected to the shaft to provide the angular position of the shaft. The control unit 170 may then adjust the control signal on conductors 180 accordingly. For example, if the machine is being operated as a motor and the load is such that the changes in the shaft angular position indicate that the motor may not be able to maintain synchronous operation then the power provided to the primary winding 140A, and therefore to the rotor 135, may be increased. As another example, if the machine is being operated as a generator and the output voltage on lines 165 is increasing then the power provided to the primary winding 140A may be decreased. The control unit 170 may vary the power by adjusting, for example, the pulse width, the pulse repetition rate, the amplitude of the control signal on conductors 180, and/or the pulse pattern (e.g., how many pulses are provided in a set of pulses, the time between each set of pulses, etc.).

This synchronous machine design provides for the use of a single compact high frequency exciter stage 125 for both synchronous motor mode and synchronous generator mode. As mentioned, the primary winding 140A and the secondary winding 140B are in a spaced apart relationship; that is, they do not contact each other, and the secondary winding 140B moves as the shaft 115 rotates whereas the primary winding 140A, mounted to the frame 110, does not move. The control unit 170 provides the high frequency control signal (input voltage) to the primary winding 140A, which induces a high frequency AC output voltage on the secondary winding 140B. This high frequency AC output voltage is rectified by the rectifier 145 to provide a direct current (DC) to the rotor 135. The rectifier 145 may be, by way of example and not of limitation, a full-wave rectifier or a bridge rectifier.

The high frequency output from the control unit 170 allows for the use of a smaller transformer 140, thereby reducing the size of the exciter section 145 and also reducing copper and iron losses. The high frequency also enables a wider control bandwidth, which provides for better machine speed stability and better torque control. This single exciter section 145 also provides a simplified machine architecture, reduced weight of copper and/or iron used therein, reduced volume, and reduced number of excitation sources (smaller component count). This single, high frequency exciter section 145 thereby provides better efficiency and higher reliability than the conventional systems mentioned above.

As seen from FIG. 1, only one rotor 135 and only one control unit 170 are used for both synchronous motor operation and synchronous generator operation. Elimination of the duplicate rotors and control units used in conventional designs reduces the volume, weight, and number of components of the synchronous machine 100.

Further, by using a high frequency AC input voltage to the transformer 140, the voltage provided to the rotor 135 is more stable than in conventional synchronous machines. A more stable voltage to the rotor 135 improves the stability and control in the process of starting the synchronous machine 100.

Figure 2:
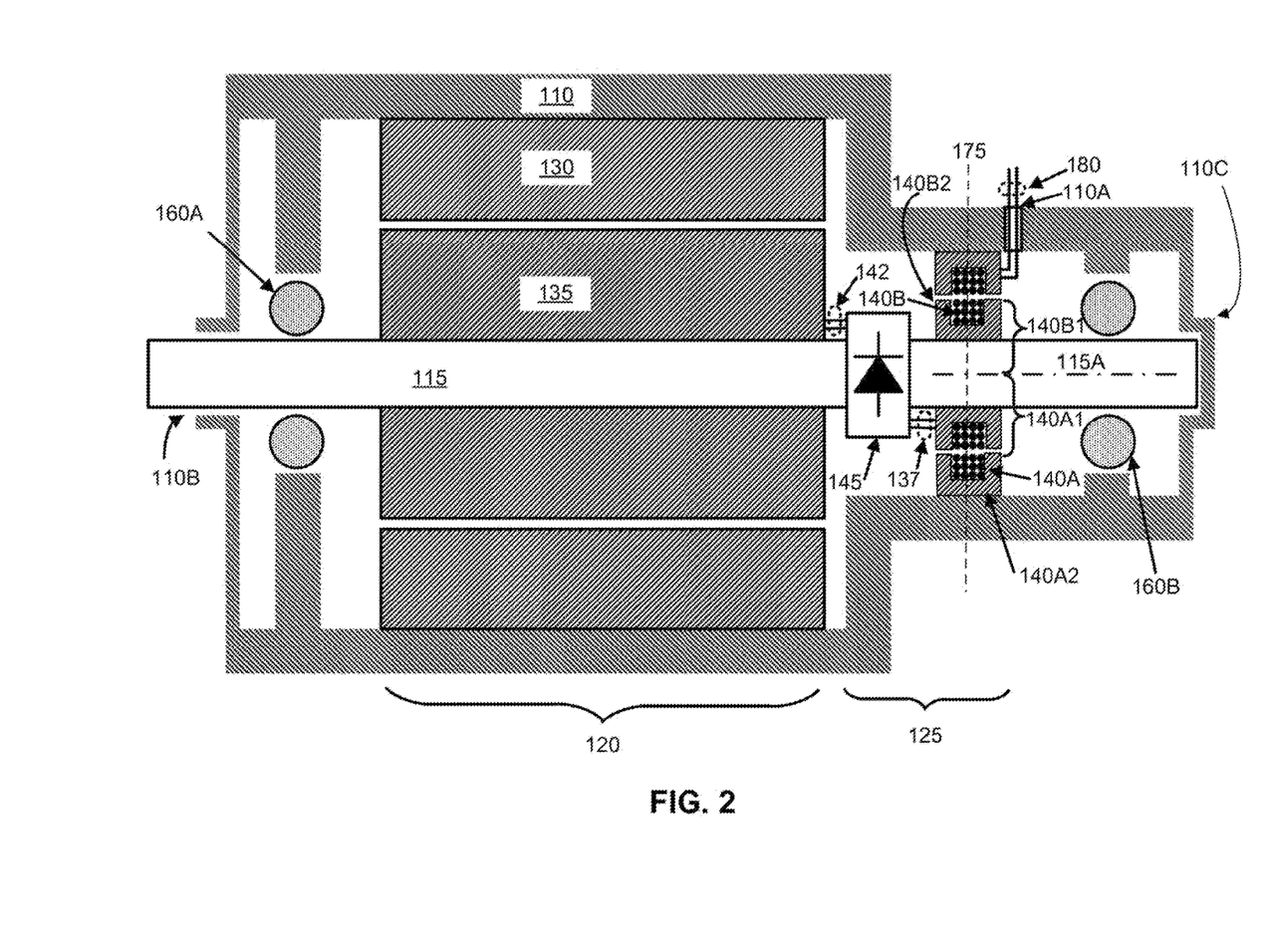
FIG. 2 is a diagram illustrating one exemplary embodiment of the synchronous machine.

FIG. 2 is a diagram illustrating one exemplary embodiment of the synchronous machine 100 showing the frame 110, the shaft 115, the stator 130, the rotor 135, the transformer windings 140A, 140B, the rectifier 145, and the bearings 160A, 160B. Also shown are conductors 180 which connect to the primary winding 140A through a hole, grommet, or other opening 110A, preferably but not necessarily sealed, in the frame 110. Also shown are conductors 137 and 142. For convenience and clarity of illustration, these conductors 137 and 142 are shown as being apart from the shaft 115. In practice, however, these conductors would preferably be mounted directly to the shaft 115 so as to minimize the centrifugal forces on these conductors. They could also be placed in a groove (not shown) in the shaft. The groove would be as shallow as possible so as to have the minimum effect on the strength and integrity of the shaft 115. If desired, the conductors 137 and 142 could be placed in a channel in the shaft 115, such as is shown in FIG. 3.

In the embodiment of FIG. 2, each transformer winding 140A, 140B is preferably in the shape of a disk, which may have a width, length, depth, wire size, and number of turns as convenient and appropriate for a particular implementation. Primary winding 140A may be considered to be an "outer" winding, and secondary winding 140B may be considered to be an "inner" winding. The primary winding 140A has an interior radius 140A1 with respect to the centerline 115A of the shaft 115, and the secondary winding 140B has an exterior radius 140B1 with respect to the centerline 115A of the shaft 115. The exterior radius 140B1 is less than the interior radius 140A1, so that winding 140B is fits inside of and is interior to winding 140A. The spacing between the windings 140A, 140B is sufficiently small that the windings 140A, 140B are magnetically coupled to each other. Preferably, windings 140A and 140B are in substantially the same plane 175. Windings 140A and 140B need not be in exactly the same plane 175, they may be slightly offset from each other. Windings 140A and 140B are considered to be in substantially the same plane, even if offset from each other, if the magnetic coupling between them is sufficient to provide the appropriate power and control to the rotor 135. The windings 140A and 140B are in a container, such as 140A2 and 140B2, respectively, to protect the windings and hold the windings in place. The containers are preferably made of ferrite or other material which serves to provide a closed path for the magnetic lines of force from the windings and to increase the magnetic coupling between the windings. The shaft 115 may also serve to concentrate the magnetic flux and increase coupling if the shaft 115 is made of or includes a ferromagnetic material, especially if the containers are not made of a material which increases the coupling.

Figure 3:
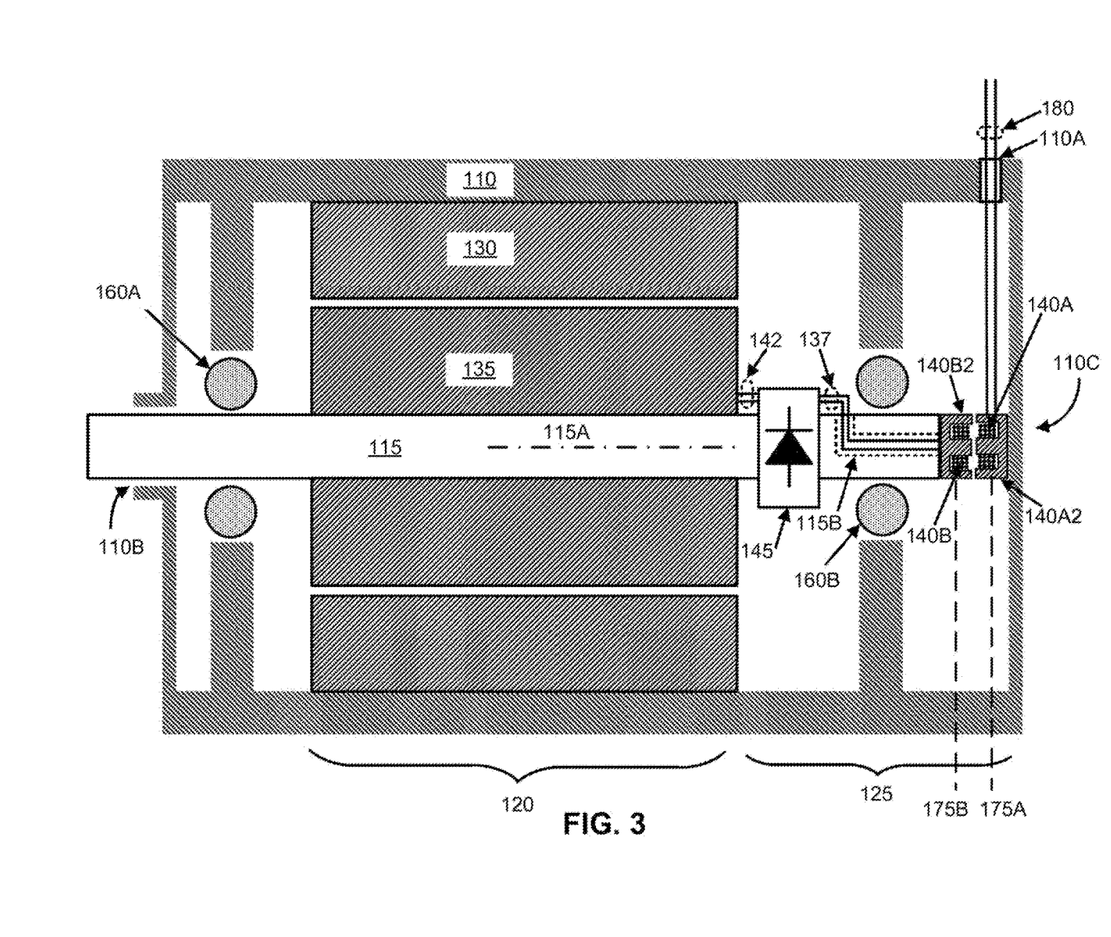
FIG. 3 is a diagram illustrating another exemplary embodiment of the synchronous machine.

Although the frame 110 is illustrated as being a stepped frame, where one part of the frame has a different radius than another part of the frame, this is not a requirement; the frame may have a different shape, such as having the same radius throughout its entire length, as shown in FIG. 3. Also, although the frame 110 is illustrated as being single-ended, that is, end 110B is open and end 110C is closed, so that the shaft 115 only extends from end 110B of the frame, this is not a requirement. The end 110C may also be an open end so that the shaft 115 may extend from both end 110B and end 110C. In addition, although the exciter section 125 is illustrated as being at the closed end 110C of the frame 110, it could instead be at the open end 110B of the frame 110.

FIG. 3 is a diagram illustrating another exemplary embodiment of the synchronous machine 100. In this embodiment transformer windings 140A, 140B are not "inner" and "outer" windings, they are parallel or facing windings but they are not in the same plane. Rather, winding 140A is in plane 175A, and winding 140B is in plane 175B so that they face each other. They are again preferably in the shape of a disk. In this embodiment the conductors 137 from the secondary winding 140B to the rectifier 145 are at least partially within a channel or hollow section 115B in the shaft 115 so that the conductors 137 do not interfere with the bearing 160B.

In an alternative embodiment, the rectifier 145 may be, if desired, positioned outside of the bearing 160B, that is, between the bearing 160B and the end 110C. In this alternative embodiment the conductors 137 may or may not be in the channel 115B, but the conductors 142 from the rectifier 145 to the rotor winding 135 would be at least partially within the channel 115B in the shaft 115 so that the conductors 142 do not interfere with the bearing 160B.

Although the rectifier 145 is shown in FIGS. 2 and 3 as being separate from the secondary winding 140B, this is not a requirement. For example, the rectifier 145 could be embedded in or within the container 140B2.

Also, the channel 115B design can be used with the embodiment of FIG. 2 if, for example, it is desired that the exciter section 125 be between the bearing 160B and the end 110C.

The embodiment of FIG. 2, in addition to the advantages and benefits described above, is also advantageous in another respect. If the synchronous machine 100 is used with, for example, a screw drive, then the compressive and tensile forces on the shaft 115 may cause the shaft 115 to shift slightly along its length, that is, toward, or away from, an end 110B or 110C, but a shift will have little effect upon the magnetic coupling between the windings 140A and 140B.

The embodiment of FIG. 3, in addition to the advantages and benefits described above, is also advantageous in another respect: reduced centrifugal forces exerted upon the windings 140A and 140B. As the windings 140A and 140B are closer to the axis 115A, the centrifugal forces exerted upon them will be less than the forces exerted in the embodiment of FIG. 2. This reduction in centrifugal forces may be significant for a synchronous machine 100 which is to be operated at a very high revolution per minute rate, as might be the case for some smaller-size synchronous machines.

Thus, the use of a single exciter stage transformer 140, instead of the use of two separate excitation stage transformers or reconfigurable windings, reduces the weight of copper and iron in the machine, and reduces the number of switches and contactors required when two transformers are used. Further, only one exciter source, control unit 170, is used, rather than two or more excitation sources. The single control unit 170 controls the synchronous machine 100 for both motor mode and generator mode of operation, simplifies the control design, and reduces the number of components. A high frequency control signal, instead of a low frequency control signal, provides for better control.

A method of operating the synchronous machine as either a synchronous motor or a synchronous generator includes (1) applying a first alternating voltage to the primary winding and applying a second alternating voltage to the stator to cause the synchronous machine to operate as a synchronous motor providing an output torque, or (2) applying a first alternating voltage to the primary winding and applying an input torque to the shaft to cause the synchronous machine to operate as a synchronous generator to provide an output voltage. At least one of a voltage, a frequency, or a duty cycle of the first alternating voltage is adjusted to control an output torque when operating the synchronous machine as a synchronous motor or an output voltage when operating the synchronous machine as a synchronous generator.

"About", "approximately", "substantially", and similar terms, as may be used herein, are relative terms and indicate that, although two values may not be identical, their difference is such that the apparatus or method still provides the indicated or desired result, or that the operation of a device or method is not adversely affected to the point where it cannot perform its intended purpose.

The subject matter described herein is provided by way of illustration for the purposes of teaching, suggesting, and describing, and not limiting or restricting. Combinations and alternatives to the illustrated embodiments are contemplated, described herein, and set forth in the claims. Various modifications and changes may be made to the subject matter described herein without strictly following the embodiments and applications illustrated and described, and without departing from the scope of the following claims.

The subject matter described above is provided by way of illustration only and are not to be construed as limiting. Various modifications and changes may be made to the subject matter described herein without following the exemplary embodiments and applications illustrated and described herein. Although the subject matter presented herein has been described in language specific to components, features, and operations, it is to be understood that the appended claims are not necessarily limited to the specific components, features, or operations described herein. Rather, the specific components, features, and operations are disclosed as example forms of implementing the claims.

The invention claimed is:

1. A synchronous machine operable in a selected mode of a generator mode and a motor mode, the synchronous machine comprising:
    a frame;
    a shaft extending from at least one end of the frame;
    a main section, comprising:
        a stationary winding mounted to the frame; and
        a rotating winding, mounted on the shaft, and spaced apart from and magnetically coupled to the stationary winding;
    a single, high-frequency exciter section, comprising:
        a transformer having a primary winding and a secondary winding magnetically coupled to each other, each winding being in the shape of a disk, the secondary winding having an exterior radius and being secured to the shaft, the primary winding having an interior radius and being mounted to the frame, the exterior radius being less than the interior radius, the secondary winding being positioned within the primary winding;
        a rectifier, secured to the shaft, to rectify an output of the secondary winding and provide a rectified output to the rotating winding; and
        a plurality of first electrical conductors to connect the output of the secondary winding to the rectifier, and to connect the rectified output of the rectifier to the rotating winding; and
    a control unit coupled with the stationary winding via a plurality of electrical lines, the control unit configured to:
        determine a first frequency of a voltage on the plurality of electrical lines; and
        provide a control signal to the primary winding of the transformer via a plurality of second electrical conductors, wherein a second frequency of the control signal is selected to be at least ten times greater than the determined first frequency.

2. The synchronous machine of claim 1 wherein the stationary winding is an armature winding and the rotating winding is a field winding.

3. The synchronous machine of claim 1 wherein the synchronous machine operates in the generator mode when an input torque is applied to the shaft.

4. The synchronous machine of claim 3 wherein:
    in the generator mode, the control unit receives an output voltage from the stationary winding via the plurality of electrical lines, the output voltage having an output frequency; and
    the control unit causes the control signal to have a frequency at least ten times greater than the output frequency of the output voltage.

5. The synchronous machine of claim 1 wherein the synchronous machine operates in the motor mode when an input voltage is applied to the stationary winding.

6. The synchronous machine of claim 5 wherein:
    the input voltage has an input frequency; and
    the control unit causes the control signal to have a frequency at least ten times greater than the input frequency of the input voltage.

7. The synchronous machine of claim 1, wherein the control signal is provided to the primary winding further using at least one of a measured rotation speed and an angular position of the shaft.

8. The synchronous machine of claim 1, wherein the control unit is further configured to:
    monitor at least a first electrical parameter associated with the stationary winding when operating in the generator mode; and
    monitor at least a second electrical parameter associated with the stationary winding when operating in the motor mode, wherein the second electrical parameter is different from the first electrical parameter,
    wherein the control signal is based on the first electrical parameter when operating in the generator mode, and wherein the control signal is based on the second electrical parameter when operating in the motor mode.

9. The synchronous machine of claim 8, wherein in the generator mode, the first electrical parameter comprises an output voltage provided by the stationary winding to the control unit, and
    wherein in the motor mode, the control signal is provided to the primary winding further using the angular position of the shaft.

10. The synchronous machine of claim 9, wherein the control unit is configured to vary at least one of a duty cycle, a frequency, or an output voltage of the control signal responsive to the first electrical parameter or responsive to the second electrical parameter.

11. The synchronous machine of claim 1, wherein the first frequency is 400 hertz and the second frequency is 10 kilohertz.

12. The synchronous machine of claim 1, wherein in the motor mode, the control unit is further configured to:
    apply the voltage to the stationary winding via the plurality of electrical lines.

13. The synchronous machine of claim 1, wherein in the generator mode, the control signal provided by the control unit to the primary winding of the transformer is the sole excitation source.

14. A method of manufacturing a synchronous machine operable as either a synchronous motor or a synchronous generator, the method comprising:
providing a frame;
mounting a stationary winding to the frame;
providing a shaft which extends from at least one end of the frame;
mounting a rotating winding on the shaft, the rotating winding being spaced apart from, and magnetically coupled to, the stationary winding;
mounting a primary winding of a transformer on the frame, wherein the primary winding has an interior radius;
mounting a secondary winding of the transformer on the shaft, the secondary winding being spaced apart from, and magnetically coupled to, the primary winding, wherein the secondary winding has an exterior radius that is less than the interior radius, and wherein the secondary winding is positioned within the primary winding;
securing a rectifier to the shaft, connecting an input of the rectifier to the secondary winding, and connecting an output of the rectifier to the rotating winding; and
coupling a control unit with the stationary winding via a plurality of electrical lines, the control unit configured to:
determine a first frequency of a voltage on the plurality of electrical lines; and
provide a control signal to the primary winding of the transformer, wherein a second frequency of the control signal is selected to be at least ten times greater than the determined first frequency.

15. The method of claim 14, wherein:
the primary winding and the secondary winding are each in the form of a disk, the disk of the primary winding defines a plane, and the disk of the secondary winding is substantially in that same plane.

16. The method of claim 14, wherein the control unit is configured to:
monitor at least a first electrical parameter associated with the stationary winding when operating as a synchronous generator; and
monitor at least a second electrical parameter associated with the stationary winding when operating as a synchronous motor, wherein the second electrical parameter is different from the first electrical parameter,
wherein the control signal is based on the first electrical parameter when operating as a synchronous generator, and wherein the control signal is based on the second electrical parameter when operating as a synchronous motor.

* * * * *

UNITED STATES PATENT AND TRADEMARK OFFICE
CERTIFICATE OF CORRECTION

PATENT NO. : 10,305,356 B2
APPLICATION NO. : 14/498186
DATED : May 28, 2019
INVENTOR(S) : Lijun Gao et al.

It is certified that error appears in the above-identified patent and that said Letters Patent is hereby corrected as shown below:

On the Title Page

In item (56), in Column 2, under "Other Publications", Line 1, delete "Applicaton" and insert -- Application --, therefor.

In the Claims

In Column 8, Line 56, in Claim 10, delete "claim 9," and insert -- claim 8, --, therefor.

Signed and Sealed this
Twenty-ninth Day of October, 2019

Andrei Iancu
*Director of the United States Patent and Trademark Office*